United States Patent

[11] 3,597,087

[72] Inventor Donald W. Dunipace
 Boulder, Colo.
[21] Appl. No. 789,038
[22] Filed Dec. 31, 1968
[45] Patented Aug. 3, 1971
[73] Assignee Ball Brothers Research Corporation
 Boulder, Colo.

[54] SAMPLE DEGRADATION DETERMINING METHOD AND APPARATUS
17 Claims, 13 Drawing Figs.

[52] U.S. Cl. ................................................. 356/103, 250/218
[51] Int. Cl. ............................................... G01n 21/26
[50] Field of Search ................................. 356/37, 102, 103, 207, 208, 239, 240; 250/218

[56] References Cited
UNITED STATES PATENTS
3,431,423 3/1969 Keller .......................... 356/103
FOREIGN PATENTS
396,390 8/1933 Great Britain
926,993 4/1955 Germany
688,653 3/1953 Great Britain

OTHER REFERENCES

Dobbins et al. " Particle Size Measurements Based On Use Of Mean Scattering Cross Sections," Journal Of The Optical Society Of America, Vol. 56, No. 10, pp. 1351— 1354, Oct. 1966.

Primary Examiner—Ronald L. Wibert
Assistant Examiner—Orville B. Chew, II
Attorney—Campbell, Harris and O'Rourke ABSTRACT: Apparatus and method to monitor light scattered by a sample in the optical path of a light beam, which sample can be degraded by contamination deposits, imperfections, gaseous matter, and the like, which degradation causes scattering of light directed to the sample. A light beam from a simulated point source is focused by an optical element and directed to the sample, after which the image of the source is occulted so that any forward light thereafter is due substantially to unocculted light scattered by the sample. The scattered light is monitored beyond the image visually by an observer, and/or by utilization of photographic or photometric means, so as to provide an indication of the amount of scattered light and hence, an indication of the degree of degrading of a sample.

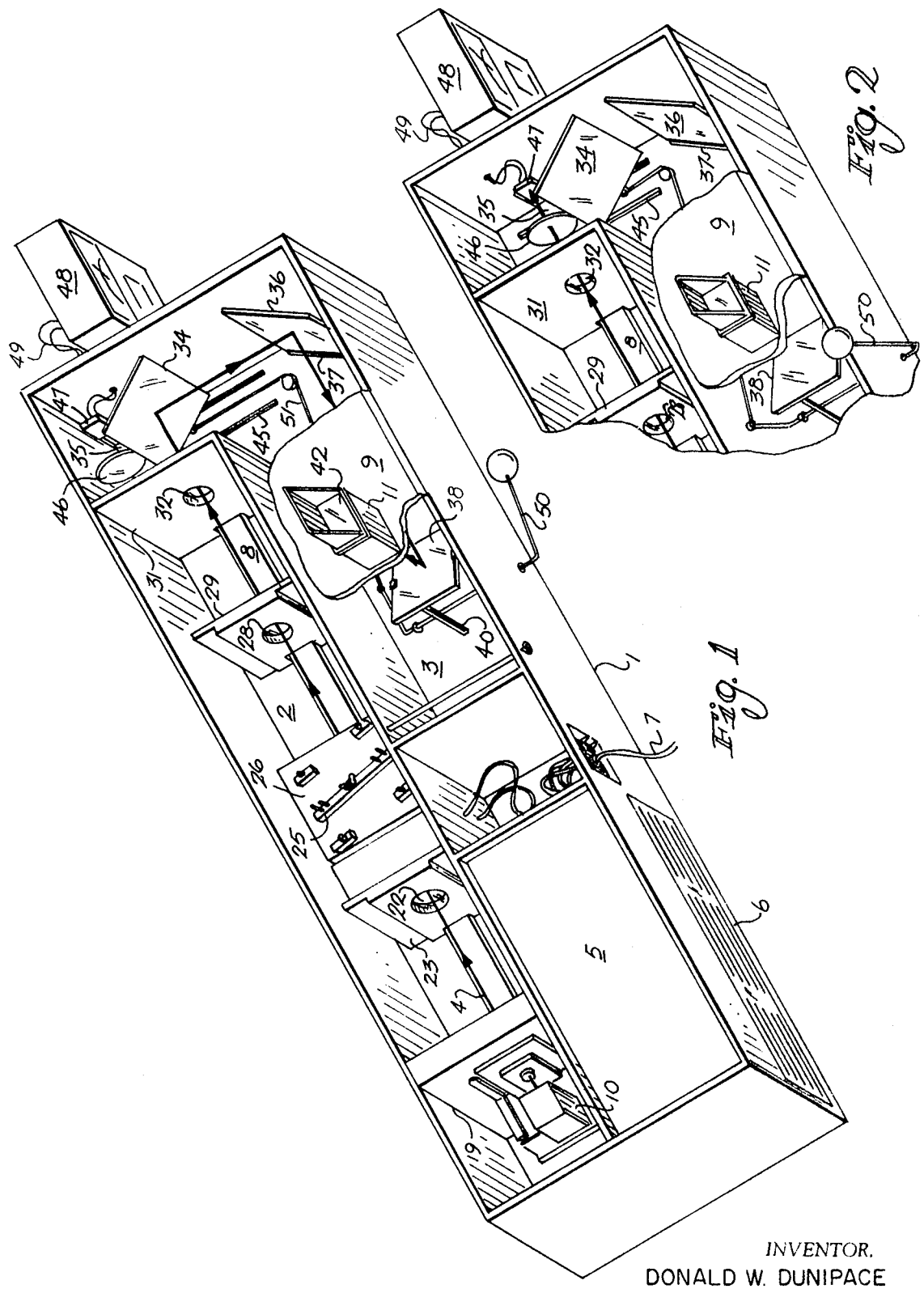

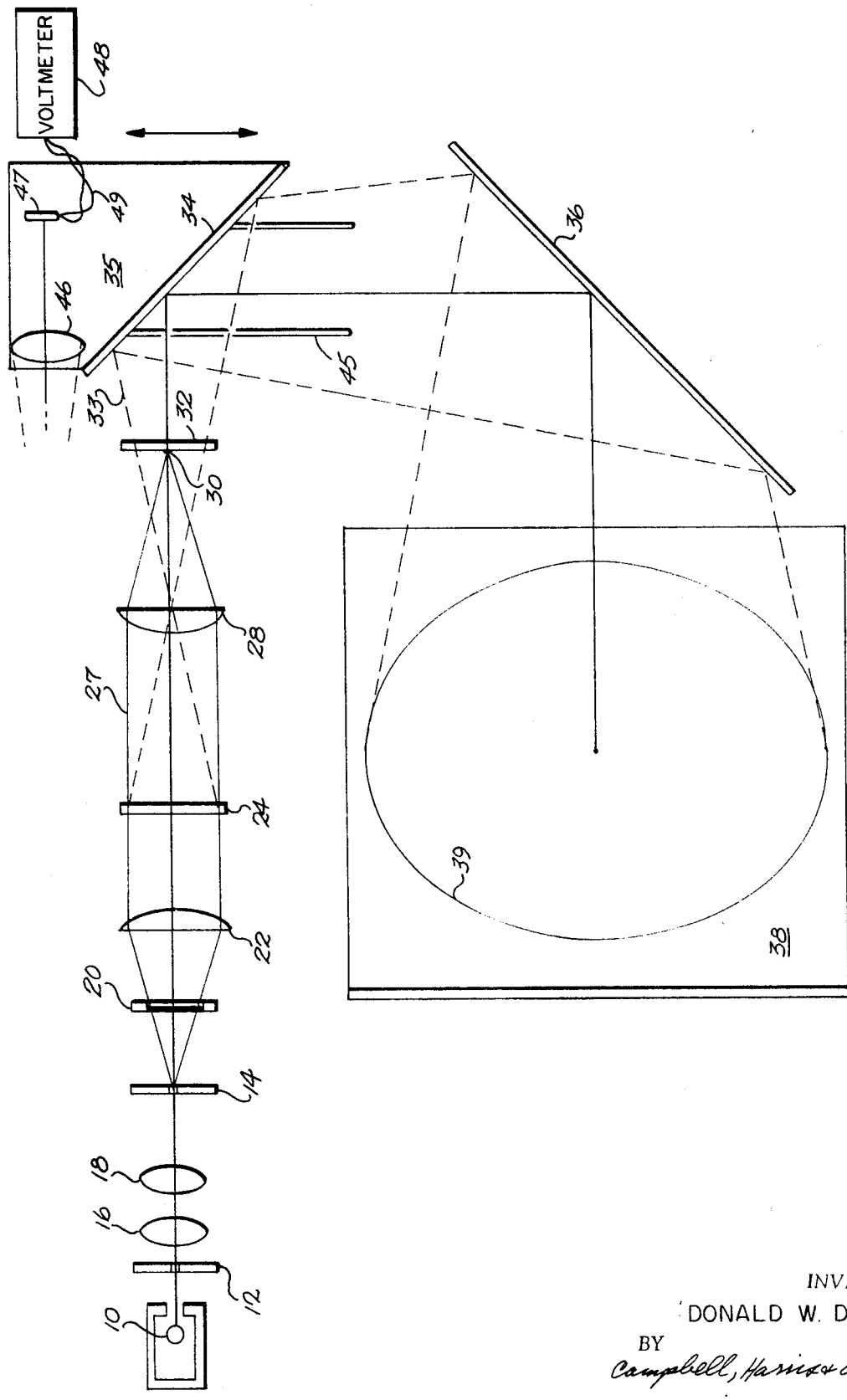

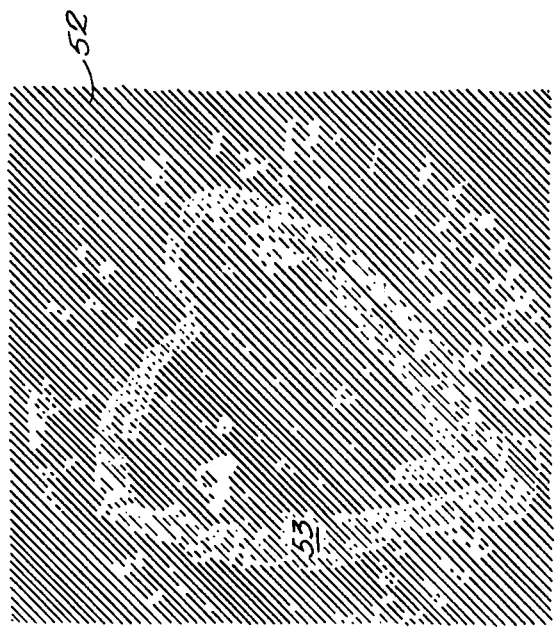
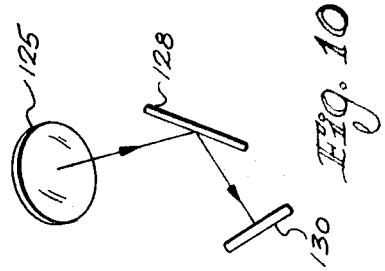
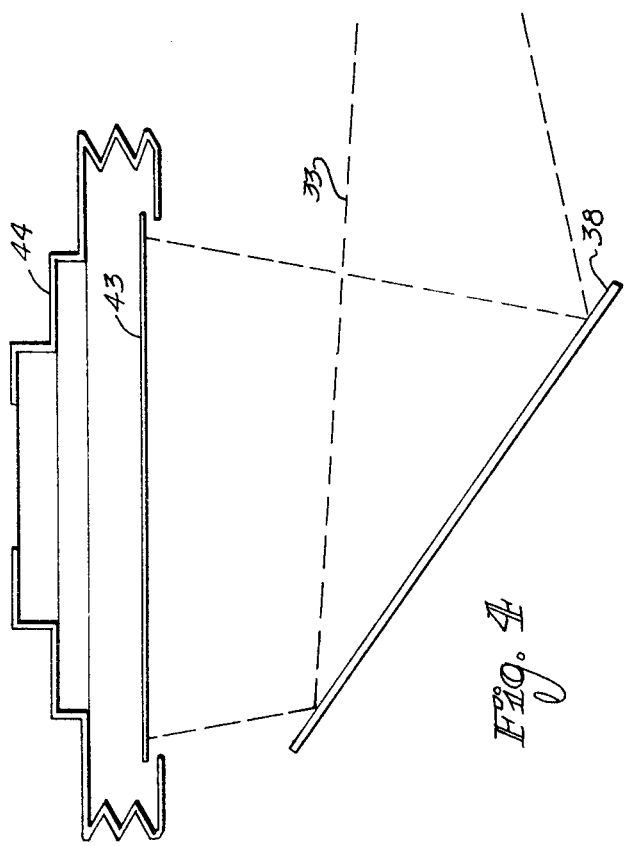
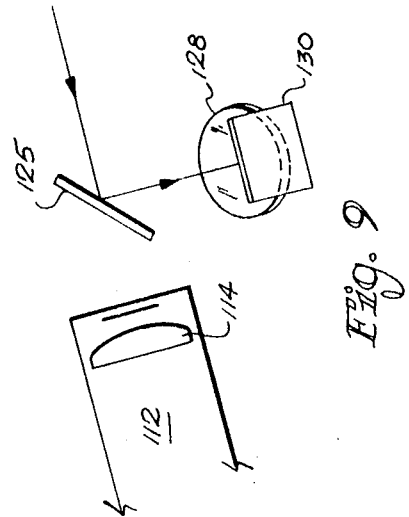

INVENTOR.
DONALD W. DUNIPACE

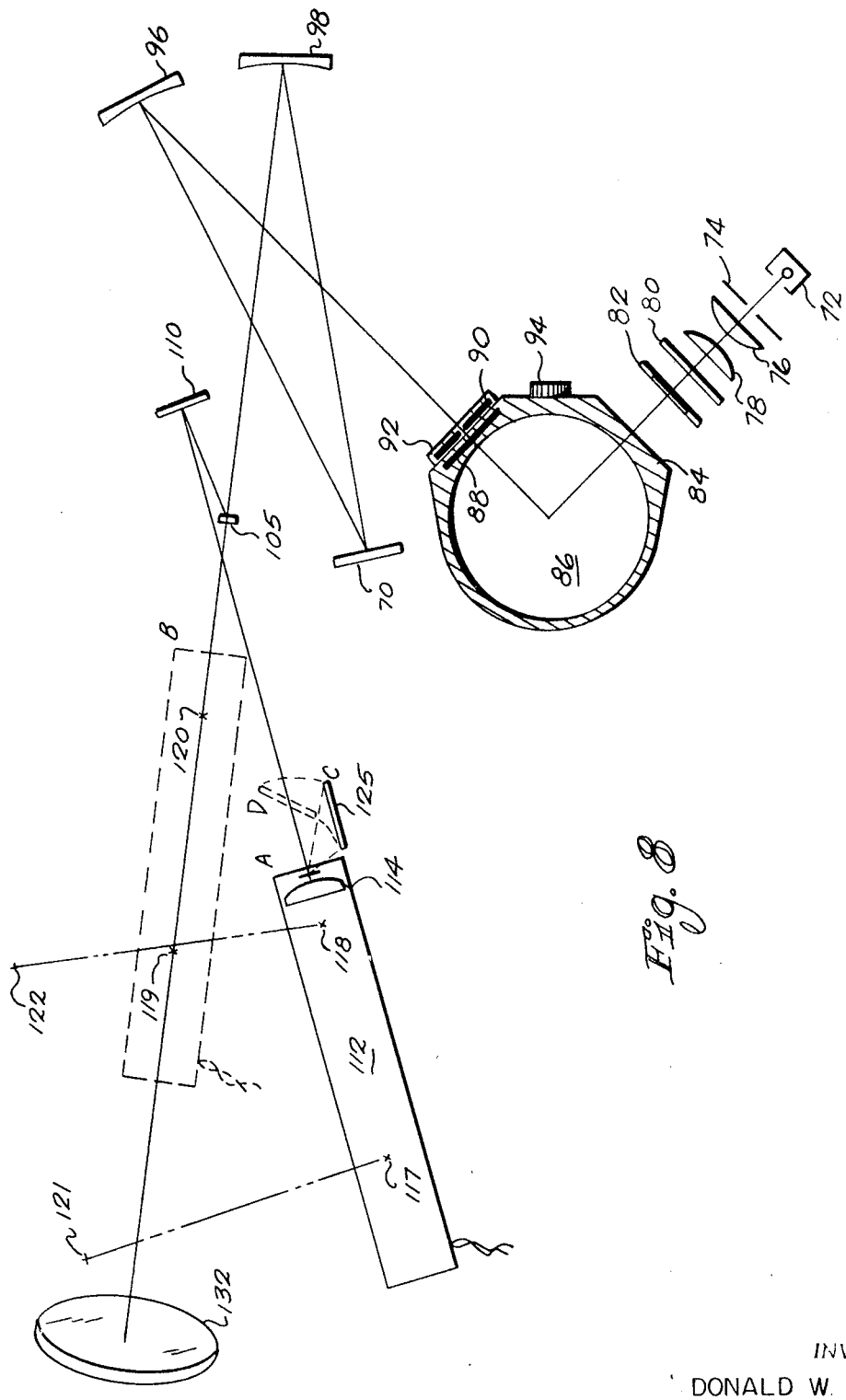

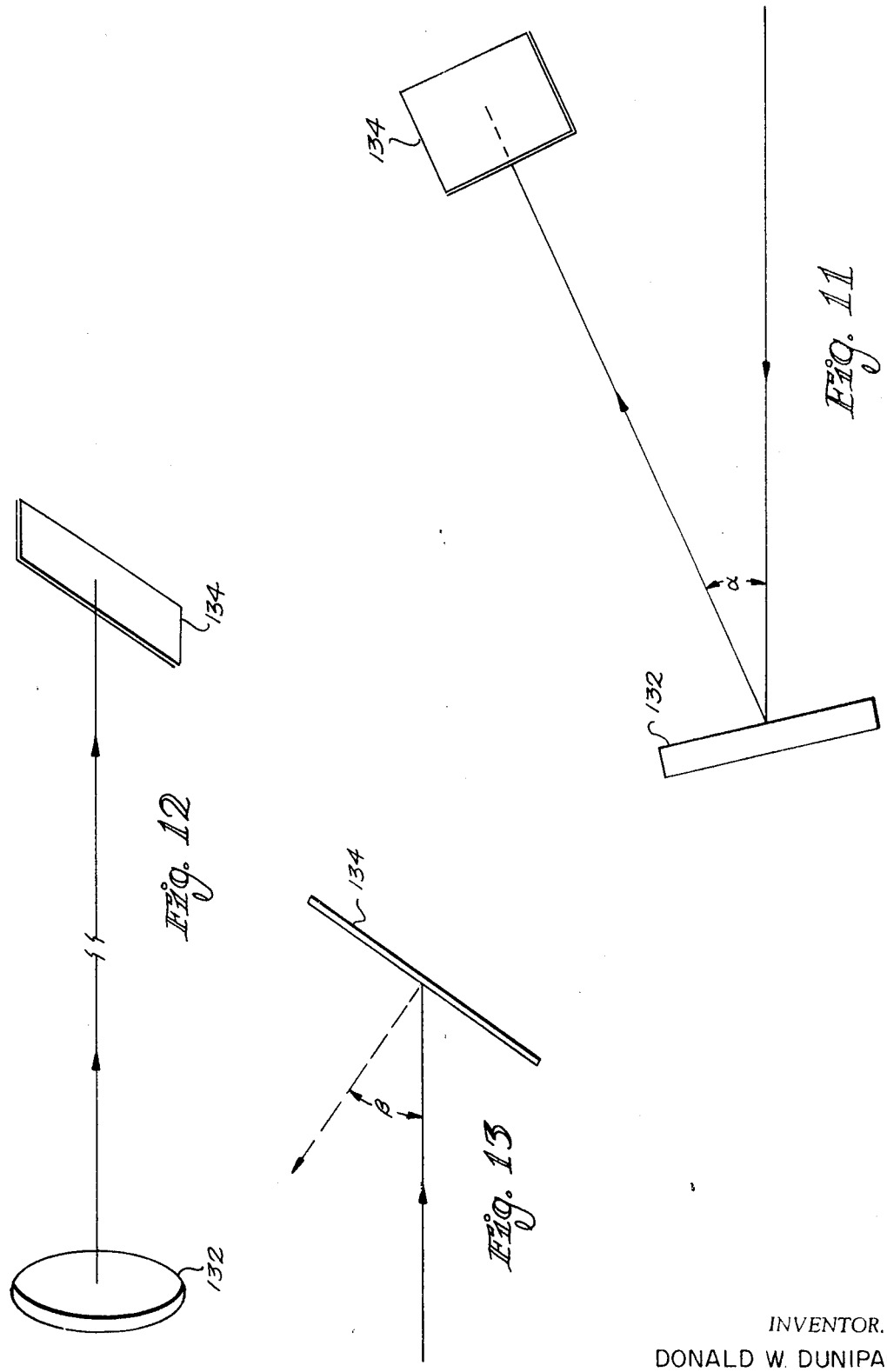

3,597,087

SAMPLE DEGRADATION DETERMINING METHOD AND APPARATUS

BACKGROUND OF THE INVENTION

1. Field of the Invention

This invention relates to sample degradation determinations utilizing optics, and more particularly to an apparatus and method to detect light scattered by a degraded sample in the optical path of a light beam.

2. Description of the Prior Art

Optics experimentation has often been hindered by imperfections of materials and/or undesirable, particulate materials located in the environment of the experiments which cause inaccuracies due to undesirable scattering of light in the optic path. Some particulate materials may, for example, originate from the support elements that mount the optical elements, from the experiment housing, from insulating materials, from organic compounds, paints, encapsulation materials, and the like, and from various other sources in the immediate environment of the instrument. In addition, vapors emanating from the materials can develop as nucleation islands and may form films which can absorb wavelengths of interest, while island droplets may also be formed.

If light scattering, whether due to imperfections or contaminants, can be eliminated, or at least reduced, then obviously results could be improved. For example, if the threat or proclivity of a given material to give off vapors which contaminate an environment, and, more particularly, which contaminate an optical element in the environment, could be accurately determined, experiment accuracy could be enhanced simply by utilization of materials having the least "threat" and/or optical elements least likely to be affected by contaminants from a material. Further, the low "threat" materials in having been evaluated, permit experimental results to be appropriately corrected for inaccuracies nevertheless resulting from scattering caused by contamination, from the material, of optical elements of the experiment. This follows since the relative amount of scattered light, corresponding to the light losses, is determined in the evaluation of the particular material.

Heretofore, attempts to produce an optical system for measuring only the scattered light caused by the presence of a contaminant have been largely unsuccessful due, at least in part, to complications introduced in separating out the unscattered component or inability to separate and visually represent the scattered component after separation. Other methods have heretofore been suggested and/or utilized, including, for example, determining the weight loss of the material while other potentially variable environmental conditions such as the vacuum, pressure, temperature, humidity, and the like were maintained substantially constant. A mass spectrometer was utilized to find the molecular weights of the species evolving from the material. By knowing the molecular weight and the density, rough estimates could be made of the coverage of a potential contaminant upon an object surface. With such data, the materials could be ranked according to their potential threat to contaminate an optical element and thereby jeopardize the accuracy of an optics experiment.

As may be expected, the prior art apparatus utilized to make such precise measurements within the narrow tolerances required is large, complex, and rather expensive. Also, the apparatus is not very mobile as to permit use in various installations. Further, the data obtained in previous attempts utilizing many of the prior art devices was only the amount of a contaminant that was deposited on a sample. The data, although related to the amount of light scattered per square centimeter of sample, was not, however a direct indication of the light scattered due to the contaminant. Since optic experiments normally measure directly the amount or intensity of light and light energy, it is necessary, or at least highly desirable, to know or minimize the inaccuracies of the system due to the loss of or extraneously added light. It is then a simple matter to directly compensate for the readings of the optical system due to light losses rather than the alternative process of determining such variables as thickness and amount of a particular contaminant and thereafter correlating this data to the amount of scattering due to weights, thicknesses, and the like of such contamination deposits. However, in the case of extraneously added light, compensation is difficult and hence minimizing this added scattered light is desirable.

Summary of the Invention

The apparatus and method of the present invention overcomes the disadvantages of prior art systems and methods. The invention provides a method and apparatus to directly monitor light scattered by a sample in a light path. In measuring light scattering due to a degraded sample, whether due to imperfections or contaminations, a direct indication of the amount of inaccuracy due to scattering is effected.

Although particularly useful in evaluating imperfections and/or the contamination threat or proclivity of materials to optical elements by independently measuring the scattering effect of such contamination on the optical element, the method and apparatus of the present invention may also be utilized to measure the amount of scattering of radiant energy, particularly a light beam, from whatever source the cause of scattering originates. For example, the scattering effected by a sample of gaseous medium may be measured or photographed to determine smog or humidity content, and the like. Also, the apparatus may be used and the method practiced to provide an indication of basic imperfections such as manufacturing imperfections in optical elements such as lenses and mirrors, as well as later arising imperfections as may be occasioned by mars, such as scratches and the like.

The invention provides apparatus and a method for determining light scattered due to a degraded sample placed in the light path. The source providing the light is occulted so that forward light not occulted is due to forward light scattering caused by a degraded sample.

It is accordingly an object of the present invention to provide an apparatus and method to monitor scattered light due to contaminants, imperfections and the like in the path of a light beam.

It is another object of this invention to provide an apparatus and method for determining sample degradation by monitoring scattered light.

It is a further object of the invention to provide an apparatus and method to monitor the amount of light which is scattered by imperfections and contaminants on a transparent optical element.

It is a further object of the invention to provide an apparatus and method to monitor the amount of light which is scattered by imperfections and contaminants on a reflecting optical element.

It is a further object of this invention to provide an apparatus and method to determine the amount of light which is scattered in a sample of air or other gaseous medium.

It is a further object of this invention to determine the amount of light scattered by a sample by occulting the image of a light source so that only scattered light is received at the determining point.

With these and other objects in view which will become apparent to those skilled in the art as the description proceeds, this invention is encompassed in the novel method, apparatus and arrangement of parts substantially as hereinafter described in the embodiments and more particularly defined by the appended claims; it being realized, however, that changes in the precise embodiments of the invention herein are meant to be included as come within the scope of the claims.

BRIEF DESCRIPTION OF THE DRAWINGS

FIG. 1 is a perspective partially cutaway view of the apparatus of one embodiment of the invention;

FIG. 2 shows a broken-away portion of the view of FIG. 1 but with the optical sensor elements of the apparatus in another operational position;

FIGS. 3 and 4 taken together form an optical schematic view of the embodiment of the invention as shown in FIG. 1;

FIG. 5 is a typical illustration of a photograph of a light scattering pattern caused by a contaminant on a sample tested in accordance with the teachings of the present invention;

FIG. 8 is an optical schematic view of the embodiment of the invention of FIG. 6 shown in a first operational position;

FIG. 9 is a schematic view taken together with a portion of FIG. 8 and illustrating a second operational position;

FIG. 10 is a view of the optical elements shown in FIG. 9 taken at a right angle with respect thereto and further illustrating relative positions of the elements;

FIG. 11 is a side view continuation of the schematic view of FIG. 8 particularly illustrating the method and apparatus of the embodiment to visually or photographically monitor the scattered light component of light passing through the system from the source.

FIG. 12 is a top view of the optical elements shown in FIG. 11 to further illustrate relative positions thereof; and FIG. 13 is a view to particularly illustrate the angle of incidence of the image of scattered light upon the ground glass plate schematically shown in FIG. 11.

DESCRIPTION OF THE PREFERRED EMBODIMENTS

Figure 6:
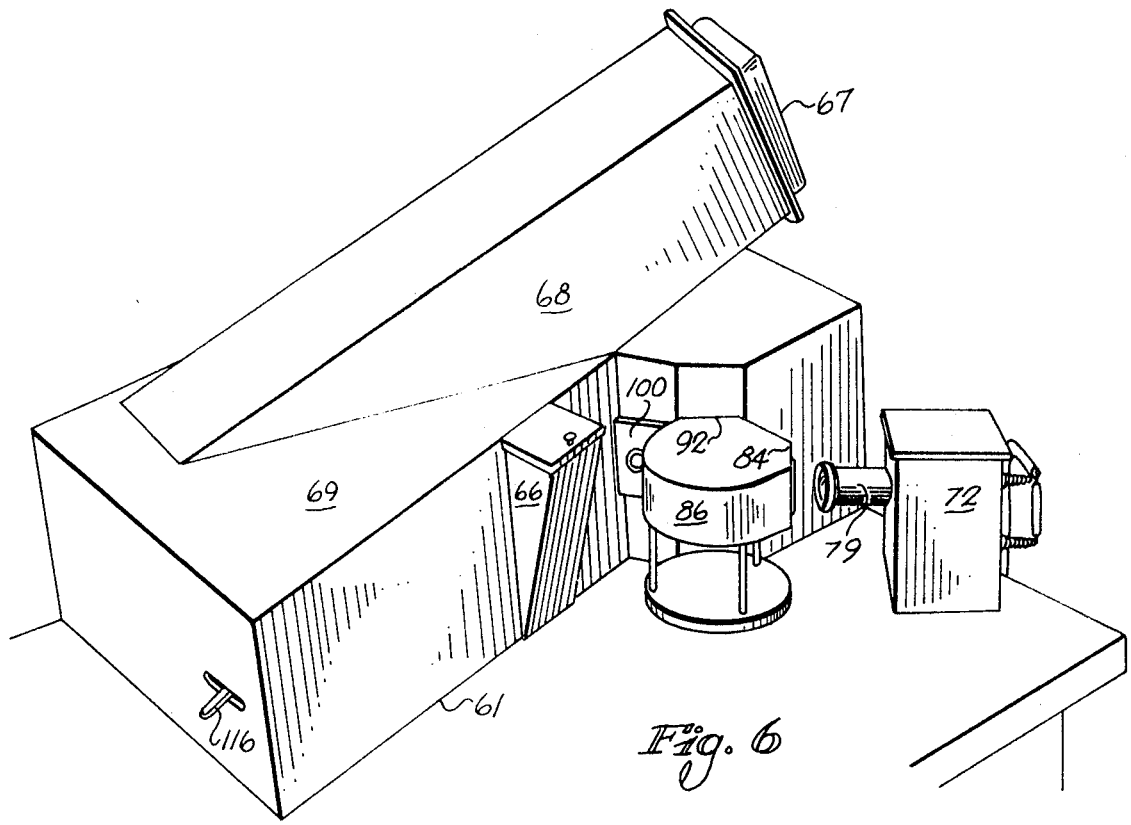
FIG. 6 is a perspective view of the apparatus of another embodiment of the invention.

Referring to FIG. 1 a housing encloses the optical elements which are constrained in predetermined positions, as hereinafter described, by suitable and conventional holders. Housing 1 includes optical sections 2 and 3 in which a line 4 is drawn to illustrate the direction of the optical path of the system relative to the apparatus, a utility section 5 which may contain a fan (not shown) to dissipate heat generated within the housing and to pull air into the housing through vents 6, for instance to thereby create a slight positive pressure inside the housing to reduce dust penetration. A transformer (not shown) is also within utility section 5 for connecting the apparatus to a source of electrical power by wires 7. A track 8 is provided at the base of housing 1 in optical section 2 so that the holders may be moved along the optical path in order to finely position the optical elements in the desired positions after which the elements are releasably secured in position by conventional fastening means (not shown). Housing 1 also includes a removable cover 9 having a viewer 11 upwardly extending therefrom for a purpose hereinafter discussed.

The optical system of the invention includes a source 10 to pass light through the apertures of a pair of aperture stops 12 and 14, as shown in FIG. 3, at opposite ends of an adjacent pair of convex condensing lenses 16 and 18. These stops and lenses are supported by individual holders such as within a composite holder 19 in optical section 2. The light radiated from the position of aperture stop 14 may be considered as a point source and is passed through a shutter 20, which also is contained in holder 19 and which may be used in the system when a picture of the light scattered by the contaminant is to be taken. Otherwise, the shutter 20 may be removed or maintained in its open sense so that a light beam is unimpaired as it passes through the shutter.

The light from the aperture stop 14 in the optical path beyond the shutter 20 is collimated by a planoconvex lens 22 which is securely positioned in a holder 23 on track 8. Scattering from the edge of the holder 23 is avoided since the cone of light to lens 22 is restricted by the positioning of aperture stops 12, 14 and condensing lenses 16 and 18. The parallel rays emerging from the lens 22 impinge upon a glass plate, or sample, 24 positioned in a holder 25 on an adjusting platform 26. Sample 24 may be tested for imperfections or for contaminants which could, for example, have been deposited thereon by previous exposure to some contaminating environment.

It should be understood that the origin of contamination or imperfection is of secondary significance in the practice of the invention, since it is the light scattered that is the parameter to be measured. However, it is contemplated that the invention may be used to monitor light scattering in a sample exposed to a variety of conditions to evaluate the proclivity or tendency of materials to contaminate an optical element positioned in the environment of a material. An evaluation of this nature would necessarily be made under controlled exposure conditions simulating as nearly as possible the environmental conditions to which the material may be subjected when used in proximity to an optical instrument or other contamination sensitive device. In such evaluations, a glass plate sample 24 would be substantially free of imperfections so as not to cause additional scatter. Further, the invention might be used in optical element manufacturing operations wherein the light scattered by the element is a direct indication of the imperfections, surface scratches and other like deficiencies of the element. Similarly, a sample 24 could be a contained gaseous medium such as air, the apparatus being utilized to measure the light scattered in the sample, which measurement may then be correlated with humidity, smog content and the like.

The rays which are not scattered by the sample remain parallel to a beam envelope 27 and are refracted through a telescopic lens 28 supported in a holder 29. An occulting disc 30, bonded such as by cement to a transparent glass plate 32, is positioned in a holder 31 at the focus point of lens 28 and is of small, but sufficient diameter to occult the image of the aperture of aperture stop 14. Light rays which are scattered by the contaminant, imperfections and other scattering media on or within the sample 24 and which impinge on the telescopic lens 28 are not parallel to beam envelope 27; more particularly, forwardly scattered rays impinge upon lens 28 at various acute angles relative to the beam envelope. These scattered light rays, as refracted within a beam envelope 33 by the telescopic lens 28, are not occulted by disc 30 and pass through and beyond the plate 32.

The scattered light rays are reflected along the optical path by a plane mirror 34 mounted on a platform 35 and a plane mirror 36 in a holder 37. Both the mirrors, in a constructed embodiment of the invention, are positioned at a 45° angle from the optical path so that the light rays are in effect "folded back" into optical section 3 in order to conserve equipment space. The scattered light impinges upon another plane mirror 38 within an envelope 39 which mirror is angularly disposed by a support 40 at substantially a 45° angle with the optical path so as to project the scattered light upwardly or in a generally vertical direction through the viewer 11 to a ground glass plate 42. Alternatively, the magnified image at plate 42 may be photographed at the position of plate 42 by substitution of a photographic film plate 43 of a camera 44 as shown schematically in FIG. 4. In this instance the exposure time of the film plate 43 may be controlled by operation of shutter 20 in its open and closed senses in conventional manner.

As may be readily appreciated, the magnification is simply the ratio of the distance as measured along the optical path, of the ground glass plate 42 (or film plate 43) from lens 28, divided by the distance of the lens 28 from the sample 24. In a constructed embodiment of the invention, the ground glass plate 42 (and film plate 43) has been positioned at a distance of five times the focal length of lens 28 and samples tested, such as sample 24, at a distance of 1 and one-fourth times the focal length of lens 28, resulting in a magnification of 4. It has been found preferable to avoid positioning the sample at a distance from lens 28 which is equal to the focal length of the lens so as to permit image formation at ground glass plate 42 (or film plate 43) without a reducing lens.

Platform 35 is mounted on tracks 45 and may be moved toward mirror 36 from the position shown in FIGS. 1 and 3 to the position shown in FIG. 2 so that the scattered light within beam envelope 33 is intercepted by a convex lens 46 which is also mounted on platform 35 so as to be moved into the optical path when mirror 36 is moved out of the path, as shown in FIGS. 1 and 2. Lens 46 is used to focus the light upon another monitor or photometric sensor such as photocell 47. This photocell controls an electrical meter in conventional manner so as to effect, for example, a visual indication upon a vacuum tube voltmeter 48 connected to the photocell by wires 49. A handle 50 extends out of housing 1 and is connected to means, such as linkage 51 to effect the bidirectional movement of platform 35 on tracks 45 from outside the housing 1.

FIG. 5 illustrates a typical scattering photograph taken of a transparent glass sample utilizing apparatus built in accordance with the embodiment of the invention shown in FIG. 1. The black shading 52 illustrates the unexposed portion of the photograph and the unshaded portion 53 illustrates the magnified image of the scattered light. The sample 24 utilized was a transparent "perfect" glass plate which had been placed about 2.5 inches from a small rocket solenoid which provided the contamination, the plate 24 being exposed near the solenoid in a vacuum for approximately 24 hours.

Figure 7:
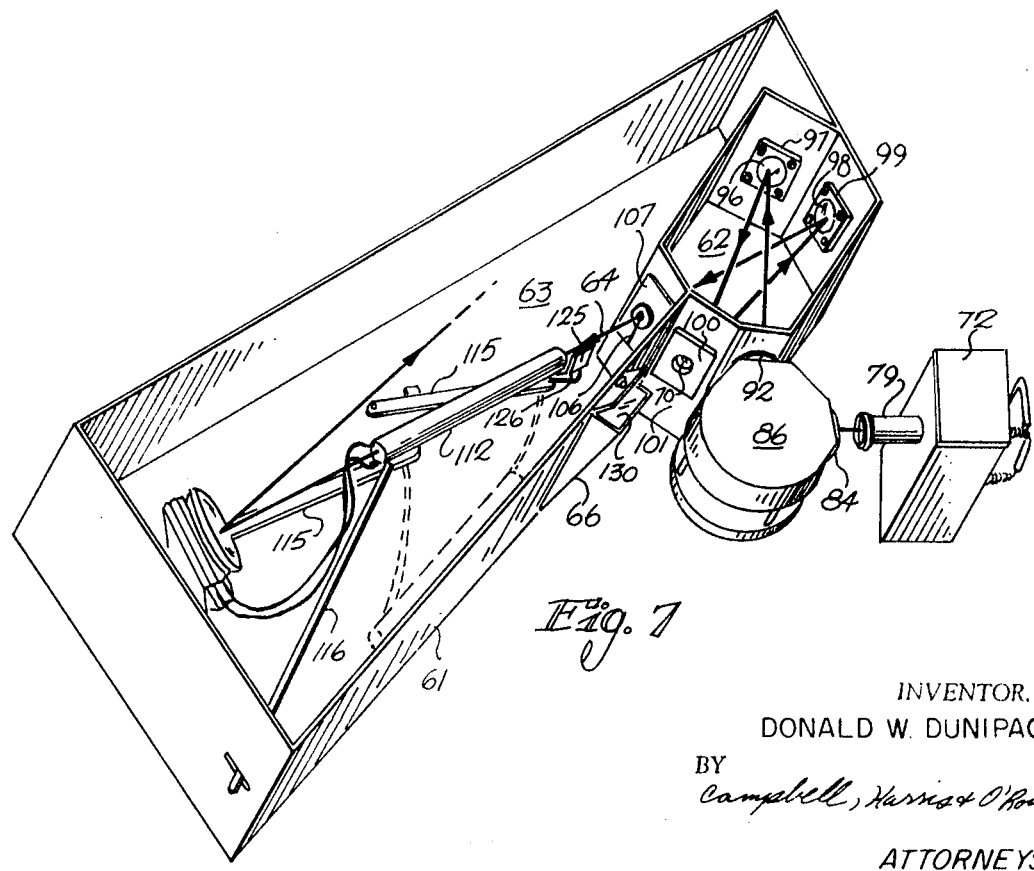
FIG. 7 is a perspective view of the apparatus shown in FIG. 6 with the housing cover removed to show the elements within the housing.

In another embodiment, as shown in FIGS. 6 and 7, a housing 61 encloses the optical elements which are constrained in predetermined positions, as hereinafter described, by suitable and conventional holders. Housing 61 includes optical sections 62 and 63 in which a line 64 is shown to illustrate the optical path of the system relative to the apparatus, a viewer 66 for observing unscattered light in the system and a viewer 67 in a neck 68 of a cover 69 for observing the scattered component of light passed through the system.

The optical system of this embodiment for measuring imperfections, contamination deposits and the like of a mirror or reflecting sample 70 includes a source 72 to pass light through the aperture of an aperture stop 74 and a pair of planoconvex condensing lenses 76 and 78 which may be held in a telescopic portion 79 attached to source 72. Concentrated light from the condensing lenses is passed through filter 80 provided to sharply eliminate color bands, as desired, below the cutoff wavelength of the filter. A shutter 82 of conventional type is provided for use when a photograph of the scattered light is to be taken with film positioned as hereinafter described. Otherwise, the shutter may be removed or simply maintained in its open sense.

The filter and shutter are mounted at the input end 84 of a variable type monochromator 86 which is provided with a pair of plates 88 and 90 at an output end 92, the plate 88 having a horizontally disposed slit and the plate 90 having a vertically disposed slit, which slits are for a purpose also hereinafter stated. Monochromator 86 is of a conventional type such as is sold under the name of "Foci Flex Grating Monochromator" by the Farrand Optical Co., Inc. New York, N.Y. Monochromator 86 has an adjustment dial 94 to control wavelength isolation means (not shown) contained therein so as to permit selection of monochromatic light, the wavelengths of which may be changed over the range of the monochromator as indicated on a scale on the body of the monochromator opposite the dial 94. In apparatus built in accordance with the invention, a grating monochromator having a passband range between 2000A to 7800A was utilized so that the relative amount of light scattered at various wavelengths for given samples, such as sample 70, can be compared with the total incident amount of light upon the sample corresponding substantially to the total of the scattered and unscattered light components.

The essentially monochromatic light emanating from monochromator 86 is directed, within the housing 61, to a spherical concave mirror 96 positioned in the optical path by holder 97. Mirror 96 reflects the light to the mirror sample 70 and therefrom to another spherical concave mirror 98 positioned by a holder 99 in the optical path from mirror 70, and which concave mirror 98 is substantially identical to mirror 96. The sample mirror 70 is held in position by a holder 100 on an outside wall 101 of optical section 62 so as to permit various samples to be interchanged without removal of the housing cover 69. The rays of the unscattered component of light are focused by mirror 98 upon an occulting disc 105 so as to produce an image of the effective point light source of monochromator 86. Disc 105 is mounted on the end of a thin arm 106 supported in a holder 107.

The focal length of mirror 96 is approximately the same as the distance therefrom to the output end 92 of the monochromator. Similarly, the focal length of mirror 98 is substantially the same as the distance therefrom to the occulting disc 105. Without appropriate compensation, astigmatism would be caused due to the light in the optical path from output end 92 of monochromator 86 impinging upon spherical concave mirror 96 at a slight angle from the optical axis of the mirror. The effect is accentuated by spherical concave mirror 98 since its optical axis is also at a slight angle from the light rays impinging thereon. It has been found that this cumulative astigmatism may be offset and effectively cancelled by passing the monochromatic light through the aforementioned horizontal slit in plate 88 and the vertical slit in plate 90 which in effect produces a "negative" astigmatism. It may be appreciated that light from a point source reflected from a spherical concave mirror, wherein the point source if positioned off the optical axis of the mirror, produces a horizontal line image at a position spaced from the mirror by a distance approximating the focal length of the mirror and a vertical line image in the same vicinity. Herein, the distance between the slits in plates 88 and 90 are made substantially the same as the distance between the horizontal and vertical line images formed when using the mirrors 96 and 98 to reflect light from an actual monochromatic point source. This distance may be readily determined for any particular pair of identical spherical concave mirrors, such as mirrors 96 and 98, by utilizing the mirrors to reflect light from an effective point source and measuring the distance between the relatively perpendicular line images formed.

Occulting disc 105 is provided with a low reflectance plane surface positioned at an angle from the optical path so as to reflect the incident light thereon to a spherical concave relay mirror 110. Mirror 110 reflects the occulted beam and projects it to a sensor, more particularly a photomultiplier tube 112 of conventional type provided to generate an electrical signal corresponding to the intensity of light impinging upon the face 114.

Normally, the unscattered light intensity is much greater than the scattered light intensity. The disc 105 is made only partially reflective so as to reduce the intensity within the range of the intensity of the scattered light component measured as hereinafter described. Further, the disc 105 should have a constant reflectivity for different wavelengths of light from monochromator 86 so that the signal generated by tube 112 is indicative of the intensity of light impinging upon the disc without correction necessitated by change in reflectivity of disc 105 incurred upon utilization of light of various wavelengths.

Tube 112 may be mounted to mechanical hinges 115 so as to enable the tube to be moved to either of two operative positions, A or B upon appropriate actuation of a handle 116. Imaginary points 117 and 118 on tube 112 correspond to the connecting positions of respective hinges 115 to tube 112 and may be visualized as moved to points 119 and 120 along respective loci defined by the former points upon being pivoted about loci centers 121 and 122, respectively, and which correspond to the connecting positions of the hinges 115 to the floor of the housing 61, as the tube 112 is moved between positions A and B. In position A, the tube 112 is directly in the optical path of the occulted beam which is reflected by occulting disc 105 and relay mirror 110. Tube 112 adjustably mounts a plane mirror 125 by other suitable hinge means 126 so as to enable the mirror to be moved to either of two positions, C or D, relative to the photomultiplier tube 112.

Plane mirror 125 serves dual purposes one of which is to function as a shutter for tube 112 which shutter is positioned in an "open" sense upon the mirror 125 being in position C at which the mirror is directly in line with the optical path between tube 112 and relay mirror 110, and positioned in a "closed" sense upon mirror 125 being at position D. In position D, and upon tube 112 being in position A, mirror 125 is also utilized to view the occulted beam as reflected by disc 105 and relay mirror 110. The beam is reflected at 90° from the incident beam to another plane mirror 128 as more particularly shown in FIG. 9. Mirror 128 is positioned at the bottom of the viewer 66 and is centered substantially along the optical path from mirror 125 so that its plane defines an angle less than 45° with the optical path (as shown in FIG. 10) in order that the beam is reflected in an upwardly direction (as shown in FIGS. 6 and 9) to a ground glass plate 130 positioned normal to the optical path of the reflected beam from mirror 128. Thus, the light originating from the effective point source at output end 92 of monochromator 86 and occulted by disc 105 may be readily viewed by an observer when tube 112 is in position A and mirror 92 is in position D relative to the tube.

As already mentioned, tube 112 may be moved to the fixed position B, as shown in dotted lines in FIG. 8. In this location, the axis of the tube is superimposed along the optical path 64 of scattered light from mirror 70 as reflected from spherical concave mirror 98, which light is not occulted by disc 105. The intensity of the scattered light may thus be monitored by the photomultiplier tube in order to produce an electrical signal to drive a meter or other indicating means (not shown).

The scattered light escaping beyond the occulting disc 105 may also be reflected by a spherical concave mirror 132 centered along the optical path when photomultiplier tube 112 is in operational position A and therefore does not obstruct the path. Mirror 132 reflects the scattered light at an acute angle $\alpha$ from the incident scattered light as shown in FIG. 11, so as to project the scattered light upwardly and along an optical path, as shown in FIG. 12, directly above the optical path of the incident light and through neck 68 of the cover 69. A ground glass plate 134 is supported in viewer 67 and is positioned in the optical path from mirror 132 at a distance substantially corresponding to the focal length of mirror 132 so that the magnified image of the scattered light may be readily observed. The optical path is broken away in FIG. 12 since spherical concave mirror 132 has a relatively long focal length compared to the focal length of of other optical elements.

The light rays along the optical path, shown by the solid line in FIG. 13, impinge upon the ground glass plate 134 at an acute incident $\beta$ as viewed from the edge of the plate. The image of the scattered light may then be observed from a position above and alongside the housing 61, such positioning being provided as a practical expedient in order to conserve space while yet allowing visual monitoring with minimum inconvenience.

The image of the scattered light may also be readily photographed by substituting a film plate (not shown) in place of the ground glass plate 134. In this instance, the film exposure time would be controlled from outside the housing 61 by operation of the shutter 82 in a conventional manner.

It may be appreciated that the scattered light component of light reflected to spherical concave mirror 98 may be considered as originating at the sample plate 70, the optical paths to and from each of which define a horizontal plane. Since the sample plate 70 is displaced from the optical axis of the spherical concave mirror 98, astigmatism will again result. This effect is cancelled by reflection of the scattered light component from mirror 132 along an optical path defining a vertical plane with the optical path leading to mirror 132. The magnified image of the scattered light component is thereupon formed at the position of the ground glass plate 134 as already discussed.

In practicing the invention in accordance with this embodiment, a "perfect" sample 70 would preferably be utilized to calibrate the system so as to permit accurate measurement of the total amount of light incident upon the reflecting occulting disc 105. The indication may be made with the use of photomultiplier tube 112 in position A while mirror 125 is in position C relative to the tube. In order to check whether the "perfect" mirror sample is indeed free of contamination, imperfections, and the like, the tube 112 may be moved to position B with mirror 125 still in position C relative to the tube, and the light intensity thereupon monitored. This reading corresponds to inherent scattering losses in the optical system and is used to adjust the reading of the scattered light component thereafter obtained upon testing of a contaminated sample on another reflecting plate such as sample plate 70.

Alignment of the mirrors may also be initially checked by visual observation of the occulted beam upon disc 105. Further, since the unscattered light, reflected from a "perfect" mirror sample 70 upon misalignment of one and/or both of concave mirrors 96, 98 or the sample mirror 70, will not be occulted thereby effecting no response (or only a nominal response) in tube 112. It has been found in utilizing apparatus built in accordance with this embodiment of the present invention, that as the particular reflecting samples, such as mirror sample 70, are interchanged, the samples may become slightly misaligned in a typical mechanical holder. It is, of course, preferable to constrain the other elements, with the exception of the tube 112 and mirror 125, so that alignment may be maintained without further adjustments for successively tested samples.

In testing a particular sample after the system is properly calibrated with a "perfect" sample mirror 70, the sample mirror to be tested is substituted in its position. Again the amount of incident light upon the occulting disc 105 may be measured with tube 112 in position A, as shown, and with mirror 125 in position C.

The photomultiplier tube 112 may be moved to position B with mirror 125 still in position C relative to the tube in order to enable the intensity of the scattered light component to be monitored. This scattered component of light, although reflected from spherical concave mirror 98 as already discussed, is not focused at the position of disc 105 and is therefore not occulted. The intensity, as measured, is then appropriately corrected to compensate for the inherent system scattering as determined in the aforementioned system calibration so as to obtain an accurate indication of the amount of the total light that is forwardly scattered by the sample 70 under test.

During both the calibration and actual test phases of the practice of the invention, the unscattered light component may be visually observed through ground glass plate 130 (see FIG. 9) while tube 112 and plane mirror 125 are in positions A and C, respectively. Further, the magnified image of the scattered light component may be readily observed through viewer 67 while tube 112 is in position A, or the image photographed by substitution of a film plate at the position of ground glass plate 134 as already described.

Obviously, other modifications and variations of the present invention are possible in view of the above teachings. It should therefore be understood that within the scope of the appended claims the invention may be practiced otherwise than as specifically described.

What is claimed is:

1. Apparatus for determining degradation of a sample, said apparatus comprising: a first optical means for collimating radiant energy directed to a sample so that degradations therein cause a portion of said energy to be scattered at said sample; occulting means; a second optical means for focusing collimated radiant energy from said sample and directing said collimated radiant energy to said occulting means, said second optical means and said occulting means segregating said collimated radiant energy into separate components with substantially only scattered energy being in one component; and means associated with said second optical means for utilization of one of said components whereby degradation of a sample can be indicated.

2. The apparatus as defined in claim 1 wherein said occulting means is positioned substantially at the focal point of said focusing means.

3. The apparatus as defined in claim 1 wherein the optical collimating means includes: a first convex lens between the sample and light source and spaced from the source by a distance corresponding to the focal length of said lens, and wherein the optical focusing means includes a second convex lens between the sample and said occulting means and spaced from said occulting means by a distance corresponding to the focal length of said second convex lens, whereby light scattered by degradations in the sample and impinging upon said second convex lens in directions other than a direction parallel to the principal axis of said lens may be projected beyond said occulting means.

4. The apparatus as defined in claim 1 wherein the optical collimating means includes: a first spherical concave mirror spaced from the light source by a distance corresponding to the focal length of said mirror; and wherein the optical focusing means includes a second spherical concave mirror spaced from said occulting means a distance corresponding to the focal length of said second spherical mirror, whereby light rays scattered by the sample and impinging upon said second spherical concave mirror may be projected beyond said occulting means.

5. The apparatus as defined in claim 1 wherein said occulting means includes reflecting means in the path of light not scattered by said sample, whereby the reflected light may be monitored to indicate the light not scattered by said sample.

6. The apparatus defined in claim 1 wherein said last named means includes means for visual observation of one of said energy components.

7. The apparatus as defined in claim 1 wherein said last named means includes means for photographing one of said energy components.

8. The apparatus as defined in claim 1 wherein said last named means includes electronic means for receiving one of said components and producing a signal indicative of the amount of sample degradation.

9. Apparatus for determining degradation of a sample, said apparatus comprising: a light source; first lens means for collimating light from said source and directing the same at said sample; second lens means for focusing collimated light received from said sample; and occulting means positioned substantially at the focus of said second lens means so that collimated light which is unscattered by the sample is occulted whereby said collimated light is segregated from light scattered by said sample, said scattered light being indicative of the degradation of said sample.

10. Apparatus for monitoring light scattered by contaminants upon and imperfections of an optical element, the apparatus comprising: a light source; first optical means for collimating the light rays passed from said source; second optical means for focusing the collimated light rays to provide an image of said source; occulting means at the focus of said second optical means for occulting said image; and means for indicating scattered light at a predetermined distance in the optical path beyond the occulted image, whereby, when said optical element is positioned in the path of the collimated light rays from said first optical means, indicated light intensity beyond the occulted image corresponds to the amount of light scattered by contaminants upon and imperfections of said optical element.

11. Apparatus for monitoring light scattered by contaminants upon and imperfections of a reflecting optical element, said apparatus comprising: a light source; a first spherical concave mirror having the optical axis at an acute angle from the optical path between said source and mirror, said mirror adapted to reflect light to the position of the optical element; a second spherical concave mirror in the path of unscattered light upon reflection from the optical element, and having an optical axis at an acute angle from the optical path between the position of the optical element and said second mirror; occulting means positioned at a distance substantially corresponding to the focal length of said second mirror; and means for compensating astigmatism produced by said spherical concave mirrors, whereby light scattered by the reflecting optical element may be projected beyond the occulting means and monitored independently of the unscattered light which is substantially occulted by said occulting means.

12. The apparatus as defined in claim 11 wherein the occulting means includes: a first plane mirror having a principal axis at an acute angle from the optical path between said second spherical concave mirror and said plane mirror; a second mirror for reflecting the unscattered light reflected from said occulting plane mirror, said second mirror having a principal axis at an acute angle from the optical axis between said occulting plane mirror and said second mirror; and means for monitoring the light reflected from said second mirror, whereby the monitored light corresponds to the unscattered component of light reflected by the optical element.

13. The apparatus as defined in claim 12 wherein the monitoring means includes a light sensor moveably positioned in the path of the light reflected from said second mirror, whereby a signal may be produced corresponding to the intensity of the unscattered component of light reflected by the optical element.

14. The apparatus as defined in claim 13 wherein the light sensor is also moveably positioned in the optical path of light projected beyond the occulting means; whereby a signal may be produced corresponding to the intensity of the scattered component of light impinging upon the reflecting optical element.

15. The apparatus as defined in claim 11 further including a third spherical concave mirror positioned in the optical path of light projected beyond the occulting means, said third mirror having a principal axis at an acute angle from the optical path between said second spherical concave mirror and said third spherical concave mirror, and the last mentioned principal axis being at an acute angle from a plane containing the optical path between said second spherical mirror and said third spherical mirror and containing the optical path between the optical element and said second spherical mirror whereby astigmatism produced upon the scattered component of light impinging upon the reflecting optical element and being reflected by said second spherical concave mirror is substantially cancelled upon reflection by said third spherical mirror so that the image of the scattered light may be observed substantially at a distance corresponding to the focal length of said third mirror along the optical path of reflection from said third mirror.

16. A method for indicating degradation of a sample, the steps comprising: collimating light from the source before focusing such that substantially only light remaining collimated from the sample is occulted; focusing light from a source to provide an image of the source; occulting the image of the source; and positioning the sample in the path of the light from the source whereby the unscattered component of the light from the focusing means is substantially occulted and thereby separated from the scattered light component.

17. A method of detecting light scattered by imperfections and contaminants on a transparent optical element, the method comprising: collimating a light beam; focusing the light beam at a predetermined position; occulting the focused light beam at the predetermined position; positioning the transparent optical element in the collimated light beam; and monitoring the light intensity in the optical path beyond the occulting position, the intensity of the light monitored corresponding to scattering of the collimated light beam due to imperfections and contaminants on the transparent optical element.